US011840345B2

(12) United States Patent
Mezzino et al.

(10) Patent No.: US 11,840,345 B2
(45) Date of Patent: Dec. 12, 2023

(54) VALVE ASSEMBLY

(71) Applicant: Microtecnica S.r.l., Turin (IT)

(72) Inventors: Giacomo Mezzino, Turin (IT); Domenico Tafuni, Turin (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 17/708,081

(22) Filed: Mar. 30, 2022

(65) Prior Publication Data

US 2022/0315227 A1 Oct. 6, 2022

(30) Foreign Application Priority Data

Mar. 30, 2021 (EP) ..................................... 21166019

(51) Int. Cl.
| | |
|---|---|
| *B64D 15/02* | (2006.01) |
| *B64D 33/02* | (2006.01) |
| *F02C 7/047* | (2006.01) |
| *F16K 3/26* | (2006.01) |
| *F16K 31/363* | (2006.01) |

(52) U.S. Cl.
CPC .............. *B64D 15/02* (2013.01); *B64D 33/02* (2013.01); *F02C 7/047* (2013.01); *F16K 3/265* (2013.01); *F16K 31/363* (2013.01); *B64D 2033/0233* (2013.01)

(58) Field of Classification Search
CPC ....................... B64D 2033/0233; B64D 15/02; B64D 33/02; F02C 7/047; F16K 3/265; F16K 31/363; F16K 17/048; G05D 16/106
See application file for complete search history.

(56) References Cited

U.S. PATENT DOCUMENTS 3,155,108 A * 11/1964 Kahn ...................... F16K 31/40
137/220
3,297,047 A * 1/1967 Sime ..................... F16K 31/406
137/220
3,338,259 A 8/1967 Tribe
(Continued)

FOREIGN PATENT DOCUMENTS

| CN | 110878856 A | 3/2020 |
|---|---|---|
| DE | 202017007092 U1 | 7/2019 |

(Continued)

OTHER PUBLICATIONS

Abstract for CN110878856 (A), Published: Mar. 13, 2020, 1 page.
(Continued)

*Primary Examiner* — Jessica Cahill
(74) *Attorney, Agent, or Firm* — CANTOR COLBURN LLP

(57) ABSTRACT

A valve assembly for an anti-ice system of an aircraft. The valve assembly comprises: a valve body; a first piston; and a regulating piston. The valve body defines a valve inlet, a valve outlet, a fluid passage between the valve inlet and the valve outlet, and a core portion defining a first chamber by cooperation with the first piston and a regulating chamber by cooperation with the regulating piston. The first piston is moveable between a first position and a second position, and the regulating piston is movable between a first position and a second position. The first piston overlaps the regulating piston when the first piston is its first position and the regulating piston is in its second position.

16 Claims, 6 Drawing Sheets

(56) References Cited

U.S. PATENT DOCUMENTS

| | | | | |
|---|---|---|---|---|
| 3,380,469 | A | * | 4/1968 | Salerno .................. F16K 31/42 |
| | | | | 251/44 |
| 3,533,434 | A | * | 10/1970 | James .................. F16K 31/406 |
| | | | | 137/220 |
| 6,742,539 | B2 | | 6/2004 | Lyons |
| 2017/0220055 | A1 | * | 8/2017 | Quaglia .................. F16K 27/00 |
| 2019/0390779 | A1 | | 12/2019 | Mezzino et al. |

FOREIGN PATENT DOCUMENTS

| | | | | |
|---|---|---|---|---|
| FR | 1255478 | A | * | 3/1961 |
| GB | 973192 | A | * | 10/1964 |

OTHER PUBLICATIONS

Abstract for DE202017007092 (U1), Published Jul. 1, 2019, 1 page.
European Search Report for Application No. 21166019.6, dated Sep. 24, 2021, 7 pages.

* cited by examiner

VALVE ASSEMBLY

CROSS-REFERENCE TO RELATED APPLICATIONS

This application claims priority to European Patent Application No. 21166019.6 filed Mar. 30, 2021, the entire contents of which is incorporated herein by reference.

TECHNICAL FIELD

The invention relates to a valve assembly for an anti-ice system of an aircraft, and an aircraft comprising such a valve assembly.

BACKGROUND

Anti-ice systems for aircraft are used to deliver heated air to aircraft surfaces to prevent or reduce ice build-up e.g. to the leading edge of a wing or an engine nacelle. They comprise valves operable to regulate the delivery of the heated air, and different type of valve can have different advantages and disadvantages.

For example, butterfly valves have a relatively high maximum mass flow rate when they are fully open compared to other types of valves, and such high mass flow rate can be preferable during engine start-up to deliver as much hot air as quickly as possible. As such, butterfly valves are often preferred. However, butterfly valves are less capable than other types of valve in maintaining linearity throughout their operational ranges, and are therefore less desirable at higher mass flows.

FIG. 1 shows a valve assembly 10, comprising a valve body 11, defining a valve inlet 16 and a valve outlet 17. The valve assembly 10 includes a shut-off piston 12 for shutting off mass flow to the outlet 17 from the inlet 16, and a regulating piston 14 for regulating the amount of mass flow through the valve assembly 10 based on downstream pressure e.g. pressure downstream of the outlet 17. During use, the regulating piston 14 will be moved depending on a pressure difference between downstream pressure and pressure in a regulating chamber 14a, which in turn will change the amount of mass flow through the valve assembly 10.

The valve assembly 10 of FIG. 1 is generally better than a butterfly valve at maintaining linearity for higher mass flows, but is less capable of high-mass flow at lower ranges. Conversely, butterfly valves are generally more capable of providing high-mass flow at lower mass-flow ranges, but are less capable of linear regulation of output pressure based on input pressure than are valves such as the valve assembly of FIG. 1. Improvements for pressure-regulating valves are therefore desirable.

SUMMARY

According to a first aspect of the invention there is provided a valve assembly for an anti-ice system of an aircraft, comprising: a valve body; a first piston; and a regulating piston; wherein the valve body defines a valve inlet, a valve outlet, a fluid passage between the valve inlet and the valve outlet, and a core portion defining a first chamber by cooperation with the first piston and a regulating chamber by cooperation with the regulating piston; wherein the first piston is moveable between a first position and a second position; wherein the regulating piston comprises an inlet port arranged to permit fluid flow between the exterior and interior of the regulating piston, and an outlet arranged to permit fluid flow from the interior of the regulating piston to the valve outlet, the regulating piston being movable between a first position in which the inlet port permits fluid flow between the valve inlet and the valve outlet via the fluid passage and the interior of the regulating piston, and a second position in which the inlet port is located within the core portion of the valve body so that the regulating piston prevents fluid flow from the valve inlet to the valve outlet; and wherein the first piston overlaps the regulating piston when the first piston is its first position and the regulating piston is in its second position.

The regulating piston may therefore be at least partially inside the first piston in at least one configuration of the valve assembly. The regulating piston may be partially inside the first piston in multiple configurations of the valve assembly, for example the regulating piston may be partially inside the first piston when the regulating piston is in its first position and when the regulating piston is in its second position. Alternatively, the regulating piston may not be inside the first piston when the regulating piston is in its first position. For example, the first piston may comprise a substantially tubular portion (e.g. a skirt portion) that is large enough to permit one end of the regulating piston to be within the volume delimited by the first piston. Thus, the first piston may be wider than the regulating piston e.g. have a greater radial extent e.g. in a direction perpendicular to a direction between the valve inlet and the valve outlet. The first piston may therefore be sized so that a portion of the regulating piston may be accommodated in the volume within the first piston. Thus, the first piston and the regulating piston may be provided in a nested arrangement.

As a consequence of the overlap of the first piston and the regulating piston, the first piston and/or the regulating piston may have a greater stroke length within the valve assembly compared to prior valve assemblies, e.g. because the stroke length of one piston does not need to affect (e.g. limit) the stroke length of the other piston (see e.g. FIG. 1 where a shut-off piston 12 and a regulating piston 14 are arranged end-to-end so that they each limit the distance the other can travel). As a consequence of the increased stroke length of the first piston and/or the regulating piston, the valve assembly may have an increased maximum airflow e.g. in its fully open configuration.

The first piston and the regulating piston may be co-axial. The valve assembly may therefore comprise a dual co-axial piston configuration with overlapping dual pistons. The first piston may be another regulating piston and may be movable to any location between its first position and its second position to regulate fluid flow through the valve assembly. However, the first piston may also be a shut-off piston. The shut-off piston may be moveable between its first position in which it permits fluid flow through the valve assembly, and its second position in which it prevents fluid flow through the valve assembly. The first piston may be disposed to open and/or close the valve inlet. The first piston may open the valve inlet in its first position, and may close the valve inlet in its second position. The first position of the first piston may therefore be a fully open positon, and the second position of the first piston may be a fully closed position.

Pressure in the first chamber may urge the first piston to its second position, away from its first position e.g. during use of the valve assembly. The first piston may therefore be actuable by controlling (e.g. increasing) pressure in the first chamber. The valve assembly may be arranged to pressurise the first chamber in order to move the first piston from its first position to its second position. For example, a solenoid valve may be provided as part of the valve assembly and may be operable to supply fluid (e.g. from the valve inlet or upstream thereof) to pressurise the first chamber and thereby actuate the first piston. The solenoid valve may be operable to prevent fluid flow to the first chamber to prevent the first chamber from being pressurised. The first chamber may therefore be a shut-off chamber i.e. operable to shut-off fluid flow through the valve assembly using the first-piston.

The first piston may comprise an end face that closes and substantially seals the valve inlet when the first piston is in its second position. The first piston may seat against an interior surface of the valve body to prevent fluid flow from the valve inlet passing through the valve along the fluid passage. The whole of the end face may be exposed to fluid in the fluid passage from the valve inlet to the valve outlet. During use, pressure acting at the valve inlet may urge the first piston to its first position (e.g. open position), counteracting pressure in the first chamber. The valve assembly may be arranged so that pressure at the valve inlet acts on the whole of the end face of the first piston to urge it to its first position. Therefore, the first piston may be more responsive to pressure at the valve inlet than prior valve assemblies that include a nose portion and an associated nose chamber at ambient pressure (see e.g. the valve assembly of FIG. 1). Indeed, the entire outermost surface of the first piston may be exposed to mass flow in the fluid passage between the valve inlet and the valve outlet.

The regulating piston and the first piston may be tubular and may be substantially cylindrical. The regulating piston may have a smaller width (e.g. diameter) than the first piston. The smaller diameter of the regulating piston may therefore enable it to move inside the first piston, at least in the second position of the regulating piston. Thus, the regulating piston may be narrower than the first piston.

When the regulating piston is in its first position, fluid may flow during use from the exterior of the regulating piston to the interior of the regulating piston, then may flow out of the outlet of the regulating piston to the valve outlet. Thus, the interior of the regulating piston may provide part of the fluid passage between the valve inlet and the valve outlet. The first position of the regulating piston may therefore be a fully open position e.g. allowing as much fluid flow into the regulating piston as possible. In the second position, the regulating piston may be arranged so that fluid flow from the valve inlet is prevented from flowing from the exterior of the regulating piston into its interior, for example by a portion of the valve body e.g. the (stationary) core portion providing the regulating chamber. The second position of the regulating piston may therefore be a fully closed position e.g. preventing as much fluid flow into the regulating piston as possible. The regulating piston may be moveable to any position between its first position and its second position. During use, the regulating piston may be movable to different positions in response to a pressure difference between upstream and downstream, and may thereby regulate fluid flow through the valve assembly. In particular, the regulating piston may move in response to a pressure differential between the regulating chamber and the fluid passage e.g. across an upstream end of the regulating chamber.

The regulating piston may be supported for movement within the valve body e.g. by the core portion and an outlet portion of the valve body (e.g. a portion of the valve body defining the valve outlet). The regulating portion may therefore bridge a gap in the valve body between the core portion and the outlet portion. The regulating piston may always bridge the gap between the core portion and the outlet portion e.g. in its first position and in its second position. As such, the valve assembly may be arranged so that no part of the valve body is within the regulating piston. This arrangement may allow the interior of the regulating piston to provide a relatively unobstructed portion of the fluid passage, and thereby allow as much fluid flow through the fluid passage as possible. Thus, there may be nothing within the regulating piston that is not part of the regulating piston itself, and hence moveable rigidly therewith. The regulating piston may be supported for movement within the valve body by contact with the valve body on its outer surface, and may be so supported only by contact on its outer surface. In contrast, the first piston may be supported for movement by contact with the valve body on an inner surface, and may be so supported only by contact with the valve body on the inner surface. This arrangement may therefore permit the regulating piston to be disposed within the first piston, each supported for movement by the core portion of the valve body.

The regulating piston may be received by and/or mounted within the core portion of the valve body, and may slide and/or move glidingly in the core portion during use. The regulating chamber may be defined between the core portion of the valve body and an end of the regulating piston. The core portion may enclose the regulating chamber. The regulating chamber may therefore be defined by the volume within the core portion and delimited by the regulating piston. The regulating chamber may therefore be entirely with the core portion. The regulating chamber may therefore be defined by cooperation of the regulating piston with an inner (e.g. inward facing) surface of the core portion. The regulating chamber may be at least partially (and may be mostly or wholly) inside the first piston when the first piston is in its first position. The first piston may therefore be disposed about the regulating chamber e.g. in its first position.

The core portion may be surrounded by the fluid passage from the valve inlet to the valve outlet, and may be entirely surrounded by the fluid passage. The core portion may be within the fluid flow passage e.g. fluid may flow around the core portion during use, between the valve inlet and the valve outlet. The core portion may be entirely within the rest of the valve body. Put simply, the core portion of the valve body may at the heart (i.e. at the core) of the valve assembly.

The first chamber and the regulating chamber may be fluidly isolated from each other within the valve assembly, and may occupy different, distinct volumes within the valve assembly. The first piston may at least partially surround the regulating chamber e.g. when the first piston is in its first configuration. The first piston may surround the first chamber, and may entirely surround the first chamber. Indeed, the first chamber may be defined by the volume within the first piston and delimited by the core portion of the valve body. The core portion of the valve body itself may not enclose any of the first chamber. The first chamber may therefore be defined by cooperation of the first piston with an outer (e.g. outward facing) surface of the core portion.

The valve assembly may be a pressure-regulating shut-off valve. The valve assembly may be a linear valve assembly, so that output pressure is substantially linearly proportional to input pressure. The valve assembly may be an anti-ice valve for an anti-ice system of an aircraft.

The valve assembly may comprise a biasing device arranged to urge the first piston to its second position. The biasing device may be a spring, or any suitable biasing mechanism for urging the first piston to the second position. The biasing device may be disposed within the first chamber, and may therefore work together with pressure in the first chamber to urge the first piston to its second position. The biasing device may be arranged so that when pressure in the first chamber is substantially equal to pressure outside the first piston, the biasing device urges the first piston into its second position. The first piston may therefore be in its second position by default, unless acted upon by pressure differences e.g. a pressure differential between fluid at the valve inlet and fluid in the first chamber, acting across the first piston.

The first piston may be mounted on (and may partially surround) part of the core portion of the valve body. The first piston may be glidingly mounted (or slide) on the core portion of the valve body. The first chamber may be the volume enclosed by the first piston and the core portion, and the first chamber may therefore be within the first piston e.g. fully within the first piston. The biasing device may be entirely within the first piston, and may be entirely within the first chamber.

The biasing device may be arranged so that during use pressure from fluid at the valve inlet above an inlet pressure threshold will move the first piston to its first position. The biasing device may be configured so that when fluid in the valve inlet has a pressure greater than the inlet pressure threshold, the force from the fluid acting on the first piston overcomes the force from the biasing device, and therefore urges the first piston to its first (e.g. open) position. The inlet pressure threshold may be a predetermined threshold above which the valve assembly is expected to operate normally, so that during use the first piston will be urged by fluid entering the valve inlet to its first position unless the first chamber is pressurised to move the first piston to its second position. Then, the first piston may always allow fluid flow through the valve assembly during use unless the first chamber is pressurised to overcome pressure from fluid in the valve inlet acting on the end face of the first piston.

The first piston may comprise an internal projection that cooperates with a projection of the core portion in the first chamber to guide movement of the first piston between its first position and its second position. The internal project may be at the centre of the first piston e.g. co-axial with the first piston and the valve assembly. The projection of the core portion may be co-axial with the internal projection of the first piston. The core portion of the valve body may therefore comprise a projection that mates with the internal projection of the first piston. The projection may help to stabilise the first piston during movement between its first position and its second position. The projection of the core portion may comprise a seal, arranged to seal with the internal projection of first piston e.g. with an inward-facing surface of the internal projection. The projection of the core portion may be within the internal projection of the first chamber. The mating projections may allow simplified mounting of the first piston to the core portion of the valve body.

The biasing device may be arranged about the internal projection and the projection of the core portion. For example, the biasing device may be a spring arranged coaxially with the internal projection of the first piston and the projection of the core portion of the valve body. Alternatively, the biasing device may be arranged within either or both of the projections.

The whole of the external (e.g. outermost) surface of the first piston may be exposed to fluid within the fluid passage. The first piston may therefore be more responsive and/or sensitive to pressure from within the fluid passage between the valve inlet and the valve outlet. The valve assembly may be arranged so that pressure from fluid at the valve inlet acts on the whole of the end face of the first piston. The outer surface of the first piston may therefore define a portion of the fluid passage (together with the valve body). Put another way, an inward-facing surface of the first piston may confront an outward facing surface of the core portion in order that the first piston is mounted.

This arrangement may be possible by provision of the biasing device and the cooperating projections, since those features allow a nose portion and an associated nose chamber of the prior art (see e.g. FIG. 1) to be absent. This also allows as much mass flow through the valve assembly as possible, since there is no nose portion and no associated nose chamber to reduce the flow cross-section at the valve inlet.

The core portion may comprise a seal arranged to seal the first chamber. The seal may be disposed on an outer surface of the core portion, and may be stationary during use of the valve assembly, particularly during movement of the first piston between its first and second positions. The seal may seal against an interior (e.g. inward-facing) surface of the first piston. Prior valve assemblies include a seal for the first piston on the piston itself rather than on the valve body, but by locating the seal on the core portion, assembly of the present valve assembly can be simplified.

The regulating piston may comprise a seal on its outer surface. The regulating piston may comprise two seals on its outer surface, and may comprise only two seals (or seals at only two locations along its length). The seal(s) of the regulating piston may contact an interior (e.g. inward-facing) surface the valve body (e.g. of the core portion) and thereby seal the regulating piston within the valve body. The regulating piston may comprise a first seal within the core portion of the valve body, sealing the regulating chamber. The regulating piston may comprise a second seal closer to the end comprising the outlet, which seal may cooperate with the outlet portion of the valve body e.g. with an inward-facing surface of the outlet portion.

The valve assembly may comprise a solenoid valve operable to pressurise the first chamber and thereby close the valve inlet using the first piston. The valve body (e.g. the core portion) may comprise an internal duct arranged to supply fluid to the first chamber under control of the solenoid valve. The solenoid valve may be mounted within a portion of the valve body.

The valve assembly may comprise a relief valve operable to control pressure in the regulating chamber. The valve body (e.g. the core portion) may comprises an internal duct fluidly connecting the regulating chamber to the relief valve. The relief valve may be operable to vent pressure from the regulating chamber if it exceeds a predetermined threshold.

Since the valve assembly dimensions are strictly constrained at a system level, the stroke length of the first piston may be more than 1.5 times that of known valve assemblies (e.g. the valve assembly shown in FIG. 1), more than 2.0 times, and/or more than 2.5 times, without increasing the overall length of the valve assembly.

Since the valve assembly dimensions are strictly constrained at a system level, the stroke length of the regulating piston may be more than 1.5 times that of known valve assemblies (e.g. the valve assembly of FIG. 1), or more than 1.8 times, and/or more than 2.3 times, without increasing the overall length of the valve assembly.

The regulating piston may comprise a support structure in its interior bridging the inlet port. As a result of the increased stroke length of the regulating piston, the inlet port of the regulating piston is longer (e.g. extends along a greater length of the regulating piston and valve assembly) than a corresponding port of prior valve assemblies. The regulating chamber is also necessarily longer than in prior valve assemblies, in order to accommodate the longer travel of the regulating piston.

The inlet port of the regulating piston may extend about the entire periphery of the regulating piston. The regulating piston may be substantially cylindrical and the inlet port may therefore extend about the whole circumference of the regulating piston such that a ring of the cylinder is absent in order to provide the inlet port. The inlet port may consist of a single contiguous and/or continuous hole in a tubular sleeve of the regulating piston. A higher rate of fluid flow through the inlet port may therefore be possible compared to known pistons in which multiple holes are provided about the circumference of the regulating piston.

The core portion may comprise a longitudinally-extending wall portion, wherein the wall portion comprises an internal duct e.g. the internal duct for the solenoid valve or the internal duct for the relieve valve) extending along the length of the wall portion. The wall portion may extend the majority of the length of the core portion in the longitudinal direction of the valve (i.e. the direction between the valve inlet and the valve outlet). The wall portion may be tubular, and may be substantially cylindrical. The internal duct may extend along more than 90% of the length of the wall portion, and/or more than 95% of the length of the wall portion. The internal duct may extend along substantially the whole length of the wall portion.

The valve body may comprise a limb connecting the core portion to the rest of the valve body e.g. supporting the core portion within the valve body and within the fluid passage. The limb may connect to the wall portion at the downstream end of the wall portion, thereby allowing the first piston to have a stroke length that is a majority of the wall portion. Thus, the first piston may travel a greater distance than was possible in previous valve assemblies.

The internal duct of the wall portion may extend from the limb to the upstream end of the regulating chamber. The internal duct may therefore extend a majority, or nearly the whole length of the wall portion. The internal duct may therefore enable fluid communication from the regulating chamber (e.g. with the relief valve) regardless of the location of the regulating piston. The internal duct may always provide fluid communication out of the regulating chamber e.g. between the regulating chamber and the relief valve.

The arrangement of the core portion of the valve body and the wall portion allows the increased stroke length, and subsequent overlap, of the first piston and the regulating piston. By locating the limb at the furthest downstream end of the core portion, the first piston, mounted outside the wall portion, can travel substantially the whole length of the wall portion. At the same time, the extension of the internal duct along the length of the wall portion allows the regulating piston to travel a greater stroke length (e.g. substantially the whole length of the wall portion), since the larger regulating chamber can still fluidly communicate e.g. with the relief valve. The limb may comprise a second internal duct fluidly connected to the internal duct in the wall portion to the relief valve.

The wall portion may be interposed between the first piston and the regulating piston. An inward-facing surface of the first piston may confront an outward-facing surface of the wall portion, and an inward-facing surface of the wall portion may confront an outward-facing surface of the regulating piston. The first piston, the wall portion, and the regulating piston may therefore be arranged concentrically. The first piston and the regulating piston may engage the same portion of the valve body i.e. the wall portion.

Given strict weight and size requirements for aircraft components, the total dimensions of the valve assembly may be strictly controlled. It may therefore not be possible to simply make the valve assembly longer in order to achieve a longer piston stroke for the first piston and/or the regulating piston. The valve assembly may therefore have the same length as prior valve assemblies (e.g. the same length as the valve assembly of FIG. 1).

According to a second aspect of the invention there is provided an anti-ice system for an aircraft comprising the valve assembly as recited herein with reference to the first aspect of the invention. According to a third aspect of the invention there is provided an aircraft comprising the anti-ice system of the second aspect of the invention, and/or the valve assembly of the first aspect of the invention.

According to another aspect of the invention there is provided an anti-ice valve comprising two pistons, wherein the two pistons are coaxial and wherein the pistons overlap each other in at least one configuration. One piston may be disposed partially within the volume delimited by the other piston in the at least one configuration. The anti-ice valve may comprise any and all of the features of the valve assembly as recited herein with reference to the first aspect of the invention.

BRIEF DESCRIPTION OF THE DRAWINGS

Certain preferred embodiments of the invention are described below by way of example only and with reference to the accompanying figures in which.

DETAILED DESCRIPTION

Figure 1:
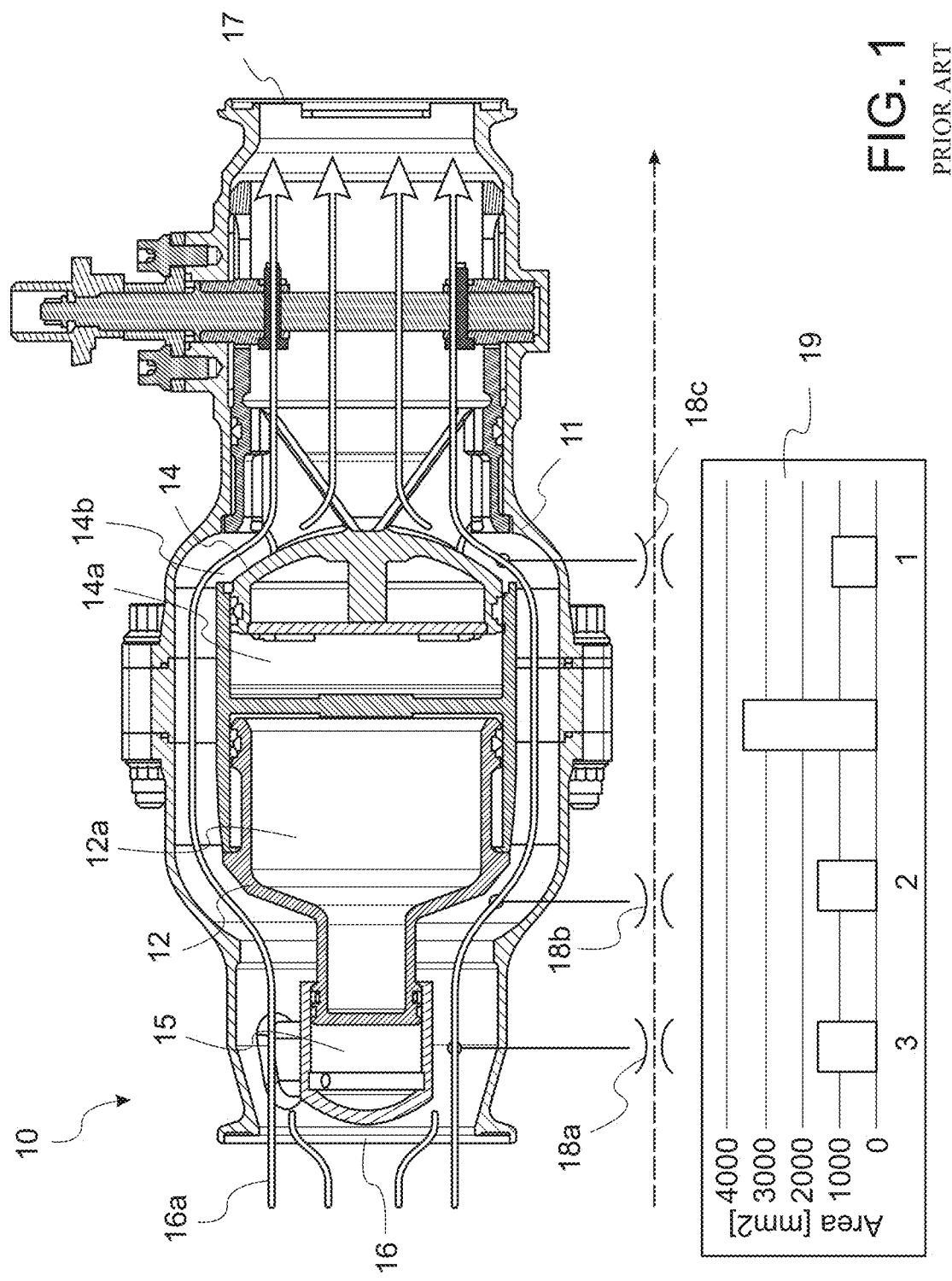
FIG. 1 shows prior art valve assembly.

FIG. 1 shows a valve assembly 10 comprising a valve body 11 defining a valve inlet 16 and a valve outlet 17. The valve assembly 10 includes a shut-off piston 12 for shutting off mass flow (e.g. fluid flow) from the valve inlet 16 to the valve outlet 17. A shut-off chamber 12a can be pressurised by a solenoid valve 160 in order to drive the shut-off piston 12 to close the inlet 16. The shut-off piston 12 moves left in the orientation of FIG. 1 in order to block fluid flow from the valve inlet 16 travelling to the valve outlet 17.

The shut-off piston 12 comprises a nose portion received by a nose chamber 15 of the valve body 11. The nose chamber 15 is vented to the atmosphere and is therefore at ambient pressure so that the nose portion of the shut-off piston 12 can move easily into the nose chamber 15. Only a portion of the outer surface of the shut-off piston 12 is exposed to fluid from the valve inlet 16.

The valve assembly 10 also comprises a regulating piston 14 for regulating the amount of mass/fluid flow through the valve assembly 10 based on the downstream pressure. During use, the regulating piston 14 is moved (left and right in the orientation of FIG. 1) depending on a pressure differential between the downstream pressure and a pressure in a regulating chamber 14a that receives the regulating piston 14, and thereby closes or opens an inlet port 14b in the regulating piston 14. The regulating piston 14 therefore restricts or increases fluid/mass flow through the valve assembly 10 and thereby regulates downstream pressure.

Schematic fluid flow lines 16a are shown through the valve assembly 10 to illustrate fluid flow though the fluid passage therein. The valve assembly 10 of FIG. 1 includes three restrictions 18 in the flow path from the inlet 16 to the outlet 17. The first restriction 18a is caused by the nose chamber 15 immediately downstream of the inlet 16. The second restriction 18b is caused by a shoulder of the shut-off piston 12. The third restriction 18c is caused by the inlet port 14b of the regulating piston. These restrictions 18 limit fluid flow through the valve assembly 10.

The plot 19 in FIG. 1 shows the flow area for fluid associated with each of these restrictions 18, labelled as 3, 2, and 1 for restrictions 18a, 18b and 18c respectively. Also shown in plot 19 is the flow area through a mid-portion of the valve assembly 10 between restrictions 18b and 18c. The plot 19 shows that the flow area through the restrictions 18 is less than that in the mid-portion of the valve assembly 10. As such, the restrictions 18 reduce the maximum mass flow through the valve assembly 10.

Figure 2:
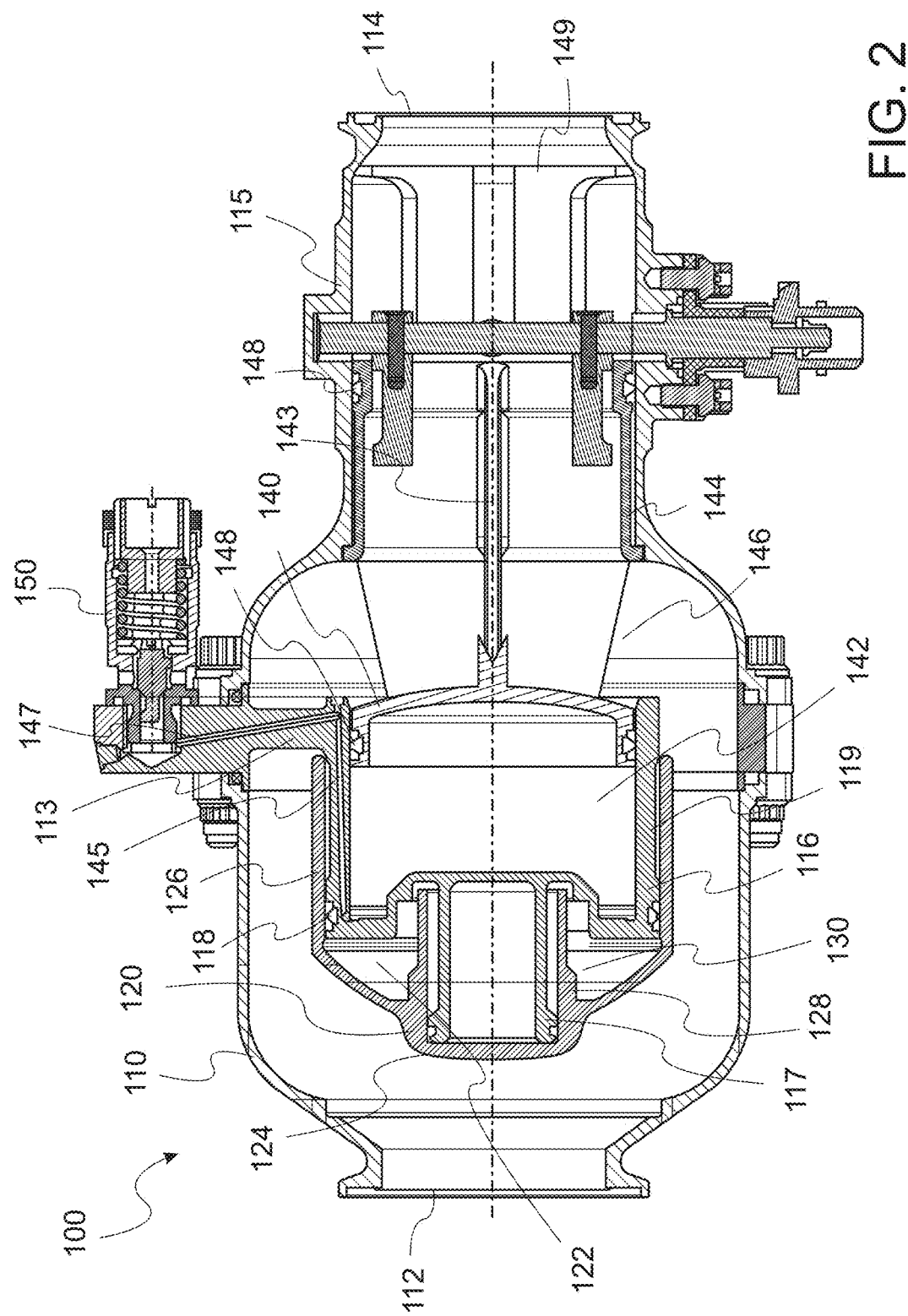
FIG. 2 shows another valve assembly having pistons with increased stroke lengths.

FIG. 2 shows a cross-section through a valve assembly 100 comprising a first piston e.g. a shut-off piston 120, and a regulating piston 140, wherein the shut-off piston 120 has a greater diameter than that of the regulating piston 140 and can therefore overlap the regulating piston 140, at least in some configurations of the valve assembly 100. The valve assembly 100 comprises a valve body 110 defining a valve inlet 112 and a valve outlet 114, with a fluid flow passage between the valve inlet 112 and the valve outlet 114. The valve body 110 also defines a core portion 116 within the fluid flow passage i.e. a portion of the valve body 110 at the core of the assembly 100, surrounded by the rest of the valve body 110. The valve body 110 is substantially rigid, and all parts of the valve body 110 are stationary with respect to the other parts.

The shut-off piston 120 and the regulating piston 140 are mounted with the core portion 116, and are glidingly engaged therewith e.g. so that they move back and fore with respect to the core portion 116. The shut-off piston 120 is mounted about the core portion 116 and is moveable between a first position e.g. an open position (rightmost in the orientation of the Figures, shown in FIG. 2) and a second position e.g. a closed configuration (leftmost in the orientation of the Figures, shown in FIG. 3). The shut-off piston 120 is mounted around a longitudinally extending wall portion 119 of the core portion 116, and thereby co-operates with the core portion 116 to define a shut-off chamber 122 within the shut-off piston 120. The valve assembly 100 comprises a solenoid valve 160 operable to pressurise the shut-off chamber 122 and thereby actuate the shut-off piston 120 from its open position (rightmost, FIG. 2) to its closed position (leftmost, FIG. 3). The valve assembly 100 also comprises a biasing device e.g. a spring 130 arranged to urge the shut-off piston 120 to its closed position. The shut-off chamber 122 will increase in volume as the shut-off piston 120 moves to its second position, and will decrease in volume as the shut-off piston 120 moves to its first position.

During operation of an anti-ice system including the valve assembly 100, pressure from fluid at the valve inlet 112 will act on an end face 124 of the shut-off piston 120, urging the shut-off piston 120 its first position (shown in FIG. 2). The spring 130 may be selected (and the valve assembly 100 may be configured) so that an inlet pressure threshold for moving the shut-off piston 120 to its first position is equal to the lowest end of an expected operational pressure range for the valve assembly 100. As such, the shut-off piston 120 will normally be open during operation of the valve assembly 100 because of fluid pressure at the valve inlet 112, unless the shut-off chamber 122 is pressurised to overcome force on the shut-off piston from fluid pressure at the valve inlet 112.

Figure 3:
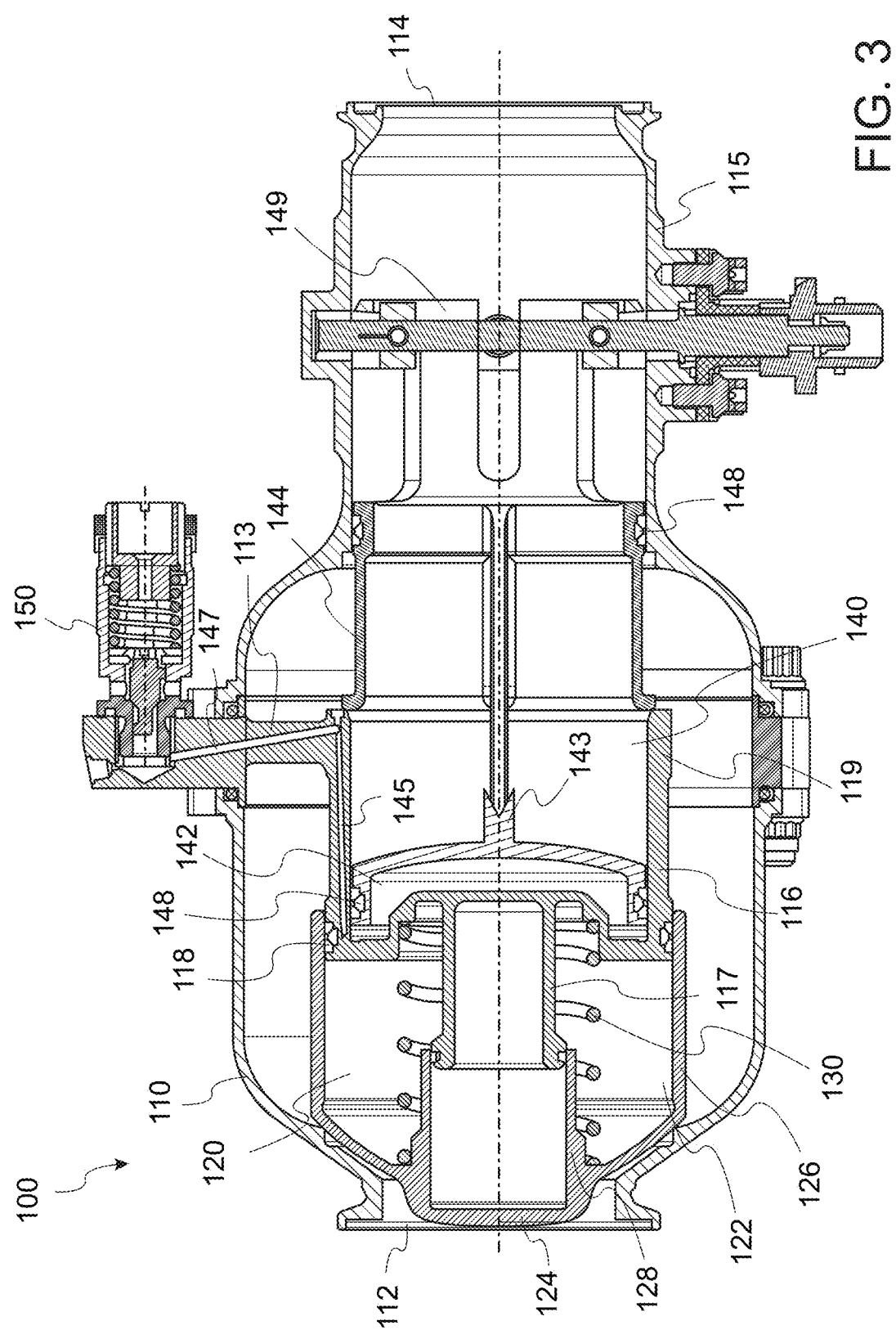
FIG. 3 shows the valve assembly of FIG. 2 in another configuration.

FIG. 3 shows the shut-off piston 120 in its closed position, with an end face 124 thereof blocking the valve inlet 112 and thereby preventing fluid flow through the valve assembly 100. The end face of the shut-off piston 120 seats against an interior surface of the valve body 110 to close the valve inlet 112. Force from the spring 130 acts together with fluid pressure in the shut-off chamber 122 to urge the shut-off piston 120 to its closed position.

A seal 118 is provided on the core portion 116 of the valve body 110 to seal against an internal (e.g. inward-facing) surface of the shut-off piston 120 e.g. against a skirt portion 126 of the shut-off piston 120. The seal 118 is therefore stationary during operation of the valve assembly 100, and does not move with the shut-off piston 120. The location of the seal 118 on an exterior part of the core portion 116 (instead of e.g. on the shut-off piston as in the assembly of FIG. 1) simplifies construction of the valve assembly 100.

The shut-off chamber 122 is defined by the interior volume of the shut-off piston 120 as limited by the core portion 116 of the valve body 110. The shut-off chamber 122 is therefore external to the core portion 116 of the valve body 110, and internal to the shut-off piston 120. The shut-off chamber 122 is entire within the shut-off piston 120.

The shut-off piston 120 also comprises an internal projection 128 that engages a projection 117 of the core portion 116 so that movement of the shut-off piston 120 is guided thereby. As such, the valve assembly 100 does not require a nose portion and a nose chamber (e.g. as in the assembly 10 of FIG. 1). The whole external surface of the shut-off piston 120 is therefore disposed in the fluid passage. The valve assembly 100 of FIGS. 2-4 therefore does not comprise a restriction analogous to the restriction 18a of FIG. 1. A relatively greater mass flow is therefore possible through the valve assembly 100 than through the valve assembly 10.

The upstream end of the regulating piston 140 (i.e. the end closest to the valve inlet 112) is received within the core portion 116 and co-operates therewith to define a regulating chamber 142. The regulating piston 140 is movable between a first position e.g. an open position (rightmost in the orientation of the Figures, as shown in FIG. 2) and a second position e.g. a closed position (leftmost in the orientation of the Figures, shown in FIG. 3). A pressure differential between fluid downstream of the valve assembly 100 and fluid in the regulating chamber 142 will act on the upstream end of the regulating piston 140 and cause it to move to any location between the open and closed positions. An inlet port 146 is defined in a sleeve 144 of the regulating piston 140 and enables fluid flow from the exterior of the regulating piston 140 (e.g. from the valve inlet 116) to enter the interior of the regulating piston 140, and to subsequently flow to an outlet 149 of the regulating piston 140. Movement of the regulating piston 140 then moves the inlet port 146 relative to the valve body 110 and the core portion 116, so that the inlet port 146 is sheathed (partially or completely) within the core portion 116 (e.g. within the wall portion 119) to reduce or increase fluid flow through the fluid flow passage accordingly. FIG. 3 shows the regulating piston 140 in its second, closed position with the inlet port 146 sheathed entirely within the wall portion 119 of the core portion 116, so that the sleeve portion 144 blocks mass flow through the fluid passage of the valve assembly 100.

The regulating piston comprises seals 148, one near the upstream end of the regulating piston 140 arranged to seal with an interior (e.g. inward-facing) surface of the wall portion 119 of the core portion 116 to seal the regulating chamber 142, and one further downstream of the regulating piston 142 to seal the sleeve portion 144 of the regulating piston 140 on an interior (e.g. inward-facing) surface of the valve body 110 e.g. of an outlet portion 115. The outlet portion 115 of the valve body 110 is the portion in which the valve outlet 114 is defined i.e. the portion of the valve body 110 near the downstream end of the assembly 100. The regulating piston 140 therefore bridges the fluid flow passage within the valve body 110, and is supported within the valve body 110 by contact therewith at its outer surface.

The interior of the regulating piston 140 provides a length of the fluid flow passage from the valve inlet 112 to the valve outlet 114. No part of the valve body 110 (e.g. no stationary part of the valve assembly 100) is disposed within the regulating piston 140 (e.g. within the volume delimited by the regulating piston 140), and therefore everything within the regulating piston 140 is part of the regulating piston 140 itself and is movable rigidly therewith. This arrangement helps ensure as high as possible mass flow through the valve assembly 100.

The regulating piston comprises a support 143 in its interior, which moves rigidly with the regulating piston. The support 143 is disposed centrally within the regulating piston 140, extending along a central axis thereof. The support 143 may be the only structure within the volume of the regulating piston 140. The support 143 bridges the inlet port 146, connecting the upstream end of the regulating piston 140 to the downstream sleeve portion 144. The inlet port 146 extends around the entire periphery of the regulating piston 140. That is, the inlet port 146 is contiguous and continuous about the entire circumference of the regulating piston 140 such that a ring of the regulating piston is absent in order to provide the inlet port 146. Put simply, the inlet port 146 is a single hole extending around the entire periphery of the regulating piston 140. The support 143 therefore connects the upstream end of the regulating piston 140 to the sleeve portion 144. The regulating piston 140 may be formed by additive manufacturing. As a result of the increased stroke length of the regulating piston 140, the inlet port 146 is longer than in previous valve assemblies, and the support 143 therefore bridges a larger distance.

The valve assembly comprises a relief valve 150 in fluid communication with the regulating chamber 142. The relief valve 150 is configured to vent fluid to reduce pressure in the regulating chamber 142 in the event that pressure in the regulating chamber 142 exceeds an upper threshold (e.g. a regulating chamber pressure threshold). The relief valve 150 therefore controls the pressure differential across the upstream end of the regulating piston 140, and hence controls the movement of the regulating piston 140.

Figure 4:
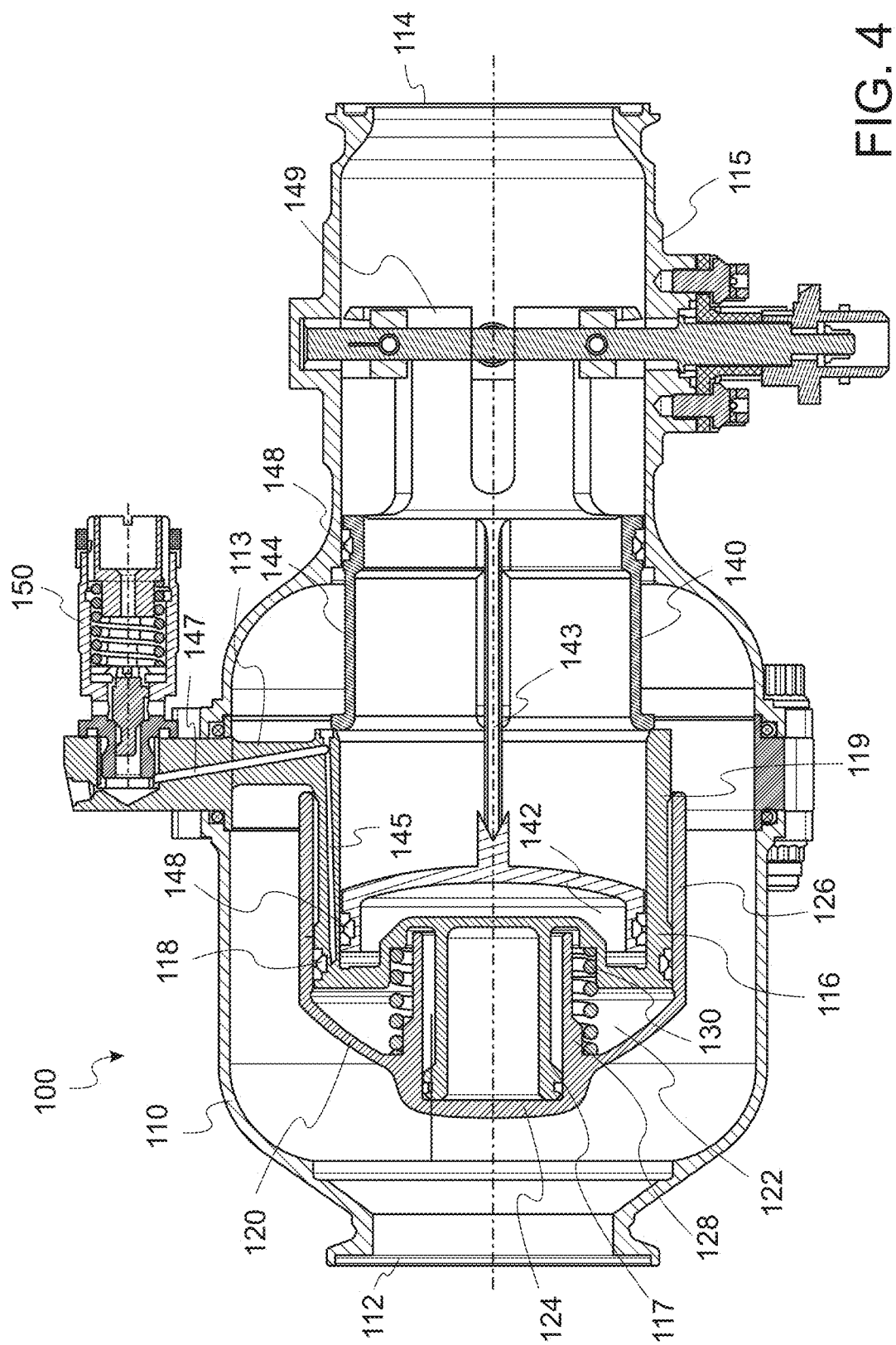
FIG. 4 shows the valve assembly of FIGS. 2 and 3 in another configuration.

FIG. 4 shows the valve assembly 100 with the shut-off piston 120 in its open position, and the regulating piston 140 in its closed position. The upstream end of the regulating piston 140 is within the volume delimited by the shut-off piston 120, and the shut-off piston 120 therefore overlaps with the regulating piston 140. The shut-off chamber 122 and the regulating chamber 142 are separate and distinct from one another, and while the shut-off chamber 122 is outside the core portion 116 of the valve body 110, the regulating chamber is inside the core portion 116. Indeed, the shut-off chamber 122 is fully outside the core portion 116 and fully inside the shut-off piston 120. In contrast, the regulating chamber 142 is fully inside the core portion 116.

The core portion 116 comprises the longitudinally-extended wall portion 119, which may be substantially tubular e.g. cylindrical. Together with the regulating piston 140, the wall portion 119 defines the regulating chamber 142 and therefore receives the upstream end of the regulating piston 140 therein. The regulating piston 120 is therefore in sliding contact with the interior of the wall-portion 119. Thus, an outward facing surface of the regulating piston 140 confronts and inward facing surface of the wall portion 119. The shut-off piston 120 is mounted around the outside of the wall portion 119 and slides along the wall portion 119 during use. The skirt portion 126 (e.g. a substantially cylindrical portion) of the shut-off piston 120 is therefore in sliding contact with the exterior of the wall portion 119 during use. Thus, an inward facing surface of the shut-off piston 120 confronts and outward facing surface of the wall portion 119. The wall portion 119 is therefore disposed between the regulating piston 140 and the shut-off piston 120. The wall portion 119 encloses the regulating chamber 142, which is limited by the upstream end of the regulating piston 140. The regulating chamber 142 is therefore entirely within the core portion 116, and outside the regulating piston 140. In contrast, the shut-off chamber 122 is entirely within the shut-off piston 120 and outside the core portion 116. Thus, the regulating piston 140 and the shut-off piston 120 are both immediately adjacent the same portion of the valve body 110, specifically the wall portion 119 of the core portion 116.

The valve body 110 also comprises a limb 113 provided to support the core portion 116 within the fluid passage of the valve assembly 100. The limb 113 is disposed at the downstream end (i.e. closest to the valve outlet 114) of the core portion 116 to allow the shut-off piston 120 to travel most of the length of the core portion 116. As such, the location of the limb 113 at the downstream end of the core portion 116 enables the increased stroke length of the shut-off piston 120.

The wall portion 119 comprises an internal duct 145 therein, provided to enable fluid communication between the regulating chamber 142 and the relief valve 150 via a limb duct 147 extending through the limb 113. The internal duct 145 connects the upstream end (i.e. the end closest to the valve inlet 112) of the regulating chamber 142 with relief valve 150 via the limb 113. Since the limb 113 is provided at the downstream end of the wall portion 119, and since the duct 145 should provide fluid communication with the regulating chamber 142 regardless of the position of the regulating piston 140, the internal duct 145 extends a majority of the length of the wall portion 119 to connect into the regulating chamber 142 at its most upstream end. The internal duct 145 may extend substantially the whole length of the wall portion 119. The internal duct 145 may therefore be disposed between the regulating piston 140 and the shut-off piston 120, at least in one configuration of the valve assembly 100.

Figure 7:
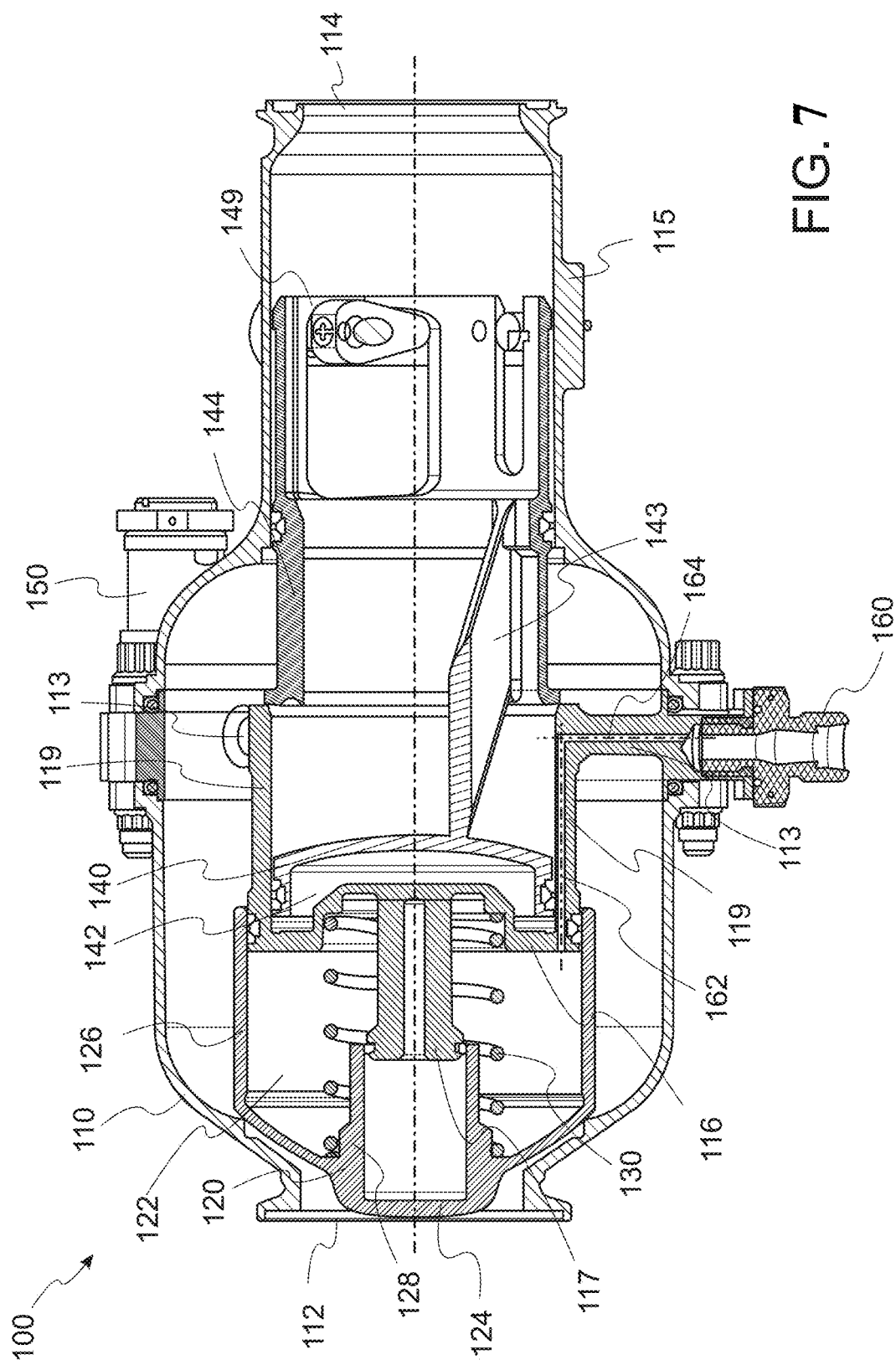
FIG. 7 shows the valve assembly of FIGS. 2-4 with an alternative cross-section.

FIG. 7 shows a cross-section through the valve assembly 100 of FIGS. 2-4, taken at an alternative angle. As can be seen from FIG. 7, the valve assembly 100 comprises a second limb 113 connecting to the wall portion 119 of the core portion 116. A second internal duct 162 is provided to enable fluid communication between the solenoid valve 160 and the shut-off chamber 122. The second internal duct 162 may be substantially the same as the internal duct 145, and may extend most or substantially all of the length of the wall portion 119. The second internal duct connects to a second limb duct 164, which in turn connects to the solenoid valve 160 for pressurising the shut-off chamber 122.

As a result of the arrangement depicted in FIGS. 2-4 and FIG. 7, both the shut-off piston 120 and the regulating piston 140 have a longer stroke length (i.e. a greater distance between their first and second positions) than the pistons 12 and 14 of the valve assembly 10 of FIG. 1 for the same overall valve assembly length. Both the shut-off piston 120 and the regulating piston 140 may have any suitable stroke length. Thus, the shut-off piston 120 and the regulating piston 140 travel a greater proportion of the length of the valve assembly 100 than analogous pistons 12, 14 in the assembly of FIG. 1. As such, the valve assembly 100 permits a much greater mass flow past each piston 120, 140 e.g. compared to restrictions 18*b* and 18*c*. Moreover, as noted above, the shut-off piston 120 does not require a nose portion an hence the valve assembly 100 does not require a nose chamber 15, and permits greater fluid flow than is possible past restriction 18*a*.

Figure 5:
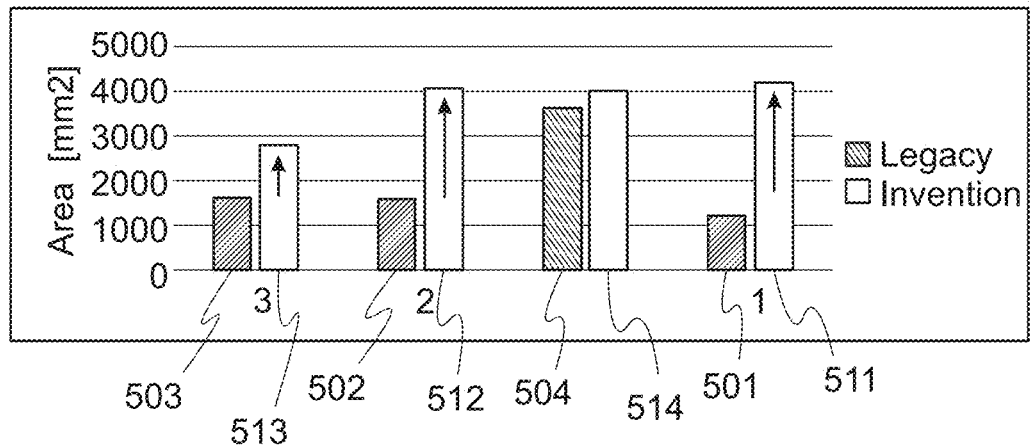
FIG. 5 shows a comparison of mass flow areas for the valve assemblies of FIGS. 1 and 2.

FIG. 5 shows an updated version of plot 19 in FIG. 1, showing the flow area at corresponding locations of the valve assembly 10 and the valve assembly 100. The flow area 501 in valve assembly 10 at the inlet port of the regulating piston 14 (corresponding to restriction 18*c*) is significantly less than the flow area 511 of valve assembly 100 at the inlet port 146 of the regulating piston 140. Flow areas 502 and 503 of the valve assembly 10 (corresponding to restrictions 18*b* and 18*a*) are significantly less than the flow areas 512 and 513 of corresponding locations in valve assembly 100. The flow area 514 at the mid-position of the valve assembly 100 is also greater than the flow area 504 at the mid-position of the valve assembly 10. The valve assembly 100 is therefore capable of greater mass flow in its fully open configuration than is valve assembly 10. As a consequence of the increased maximum mass flow, the valve assembly 100 can supply an increased fluid flow in its fully open configuration e.g. during engine start-up.

Figure 6:
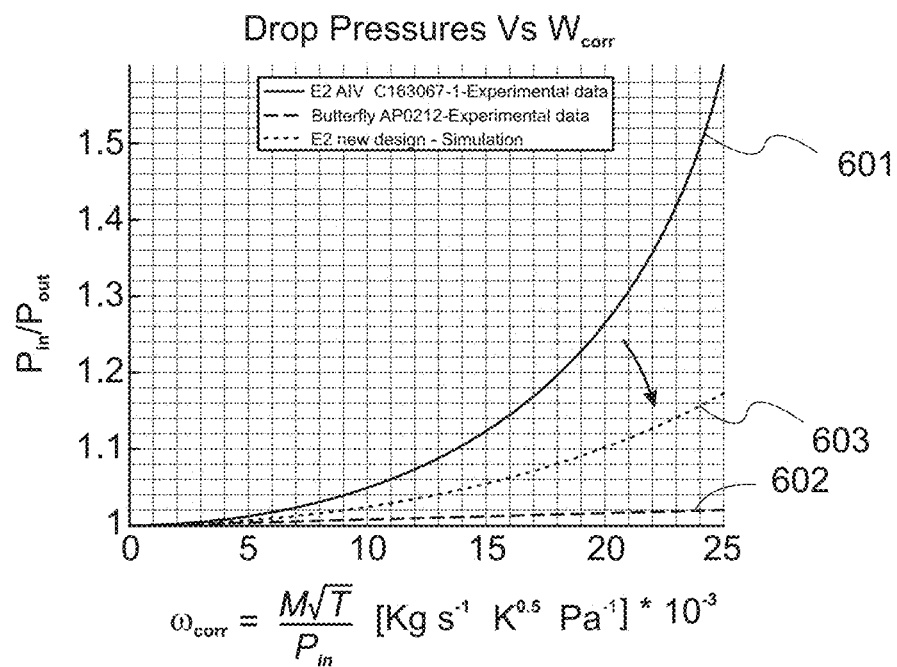
FIG. 6 shows data for different valve assemblies.

FIG. 6 shows a plot comparing experimental data for the valve assembly of FIG. 1 (line 601), experimental data for an alternative butterfly valve (line 602), and simulation data for the valve assembly of FIGS. 2-4 (line 603). The plot shows different characteristic curves of the different control valves, with the pressure drop as a function of the correct flow rate. The typical behaviour for a valve with butterfly architecture (line 602) shows the pressure drop rapidly growing with the flow, whereas the behaviour for a typical valve with piston architecture (line 601) shows that the pressure drop is less affected by the flow rate. The valve assembly 100 (line 603) shows an intermediate behaviour between the two typical curves. Although the butterfly valve 602 may be superior in the depicted range of values, the assembly of FIGS. 2-4 (line 603) is significantly better than the assembly 10 of FIG. 1 (line 601), being closer to the data from the butterfly valve 602.

The valve assembly 100 is therefore improved at high mass flow rates. Moreover, the valve assembly 100 exhibits better linearity at lower mass flow rates than an equivalent butterfly valve (though this is not shown in FIG. 6). As such, the valve assembly as described herein maintains the advantages of piston-based regulating valves over butterfly valves, and reduces the disadvantages of those valves compared to butterfly valves e.g. at high mass flow rates.

The invention claimed is:

1. A valve assembly for an anti-ice system of an aircraft, comprising:
 a first piston moveable between a first position and a second position;
 a regulating piston having an interior and an exterior; and
 a valve body;
 wherein the valve body defines a valve inlet, a valve outlet, a fluid passage between the valve inlet and the valve outlet, and a core portion defining a first chamber by cooperation with the first piston and a regulating chamber by cooperation with the regulating piston;
 wherein the regulating piston comprises:
 an inlet port arranged to permit fluid flow between the exterior and interior of the regulating piston; and
 an outlet arranged to permit fluid flow from the interior of the regulating piston to the valve outlet;
 wherein the regulating piston is movable between a first position in which the inlet port permits fluid flow between the valve inlet and the valve outlet via the fluid passage and the interior of the regulating piston, and a second position in which the inlet port is located within the core portion of the valve body so that the regulating piston prevents fluid flow from the valve inlet to the valve outlet; and
 wherein the first piston overlaps the regulating piston when the first piston is its first position and the regulating piston is in its second position.

2. The valve assembly as claimed in claim 1, comprising a biasing device arranged to urge the first piston to its second position.

3. The valve assembly as claimed in claim 2, wherein the biasing device is arranged so that pressure from fluid at the valve inlet above an inlet pressure threshold will move the first piston to its first position.

4. The valve assembly as claimed in claim 1, wherein the first piston comprises an internal projection that cooperates with a projection of the core portion in the first chamber to guide movement of the first piston between its first position and its second position.

5. The valve assembly as claimed in claim 1, wherein the whole of the external surface of the first piston is exposed to fluid within the fluid passage.

6. The valve assembly as claimed in claim 1, wherein the core portion comprises a seal arranged to seal the first chamber.

7. The valve assembly as claimed in claim 1, wherein the regulating piston comprises a seal on its outer surface.

8. The valve assembly as claimed in claim 1, further comprising:
 a solenoid valve operable to pressurise the first chamber and thereby close the valve inlet using the first piston.

9. The valve assembly as claimed in claim 1, further comprising:
 a relief valve operable to control pressure in the regulating chamber.

10. The valve assembly as claimed in claim 1, wherein the regulating piston comprises a support structure in its interior bridging the inlet port.

11. The valve assembly as claimed in claim 1, wherein the inlet port of the regulating piston extends about the entire periphery of the regulating piston.

12. The valve assembly as claimed in claim 1, wherein the core portion comprises a longitudinally-extending wall portion, and wherein the wall portion comprises an internal duct extending along the length of the wall portion.

13. The valve assembly as claimed in claim 12, wherein the wall portion is interposed between the first piston and the regulating piston.

14. An anti-ice system for an aircraft, comprising:
 a valve assembly as claimed in claim 1.

15. An aircraft comprising an anti-ice system as claimed in claim 14.

16. An aircraft comprising a valve assembly as claimed in claim 1.

* * * * *